United States Patent

Doden et al.

[11] Patent Number: 6,069,784
[45] Date of Patent: May 30, 2000

[54] METHOD AND APPARATUS FOR DRIVING A SOLENOID VALVE

[75] Inventors: Berend-Wilhelm Doden, Ludwigsburg; Michael Friedow, Tamm; Michael Mettner, Ludwigsburg; Martin Öhler, Weinsberg; Günther Hohl, Stuttgart; Erich Ludewig, Kornwestheim, all of Germany; Dietmar Sommer, Charleston, S.C.

[73] Assignee: Robert Bosch GmbH, Stuttgart, Germany

[21] Appl. No.: 08/983,082

[22] PCT Filed: Mar. 15, 1997

[86] PCT No.: PCT/DE97/00532

§ 371 Date: Jan. 9, 1998

§ 102(e) Date: Jan. 9, 1998

[87] PCT Pub. No.: WO97/44225

PCT Pub. Date: Nov. 27, 1997

[30] Foreign Application Priority Data

May 17, 1996 [DE] Germany .......................... 196 20 037

[51] Int. Cl.$^7$ ....................................................... H01H 47/12
[52] U.S. Cl. ............................ 361/187; 361/170; 361/160
[58] Field of Search ..................................... 361/152–156, 361/160, 203, 187, 170

[56] References Cited

U.S. PATENT DOCUMENTS 5,313,153  5/1994  Locher et al. .......................... 323/284
5,703,748  12/1997  Fulks et al. ............................. 361/154

FOREIGN PATENT DOCUMENTS 38 05 031  8/1989  Germany .

*Primary Examiner*—Fritz Fleming
*Attorney, Agent, or Firm*—Kenyon & Kenyon

[57] ABSTRACT

An apparatus and a method for driving a solenoid valve, which includes a coil and a movable armature. To move the armature, current and/or voltage is applied to the coil in a clocked manner. By varying the driving, the solenoid valve can be operated optionally as a control valve or as a relief valve.

13 Claims, 3 Drawing Sheets

METHOD AND APPARATUS FOR DRIVING A SOLENOID VALVE

FIELD OF THE INVENTION

The present invention relates to a method and apparatus for driving a solenoid valve.

BACKGROUND INFORMATION

A conventional method and apparatus for driving a solenoid valve, described in German Published Unexamined Application No. 38 05 031 (corresponding to U.S. Pat. No. 5,313,153), includes a coil and a movable armature. To set the armature into motion, current and/or voltage is applied to the coil. For this, the coil is connected with clocked timing via a switching device to a voltage source.

When using such conventional solenoid valves in motor vehicles, different voltages are applied to the solenoid valves. This causes different behavior of the solenoid valve in different operating states. Defined operation of the solenoid valve thus requires additional outlay.

SUMMARY OF THE INVENTION

The present invention provides a method and apparatus for driving a solenoid valve. A coil and a movable armature are provided. Current and/or voltage are applied to the coil to move the armature in a clocked manner using a predetermined duty factor. According to the present invention, by varying the driving action, the solenoid valve can be operated optionally as a control valve or as a relief valve.

DETAILED DESCRIPTION OF THE DRAWINGS

The procedure according to the present invention is described hereafter based on a solenoid valve used to, e.g., control brake fluid in an ABSR hydraulic unit. In ABS (anti-lock braking) systems and/or ASR (traction control) systems, the hydraulic fluid is controlled using solenoid valves. So-called integrated selector/relief valves are used which, depending on the control strategy, abruptly relieve the pressure built up by a pump to a so-called main brake cylinder, or limit the pressure to an adjustable value. The abrupt pressure relief is associated with disruptive noise generation. One objective of the present invention is to reduce this noise during operation.

The method and apparatus according to the present invention is not limited to this application, and can be used in all electromagnetic loads. The method and apparatus can also be used in solenoid valves with which the fuel metering in internal combustion engines is controlled and/or the pressure in injection systems for internal combustion engines is controlled and/or limited.

Figure 1:
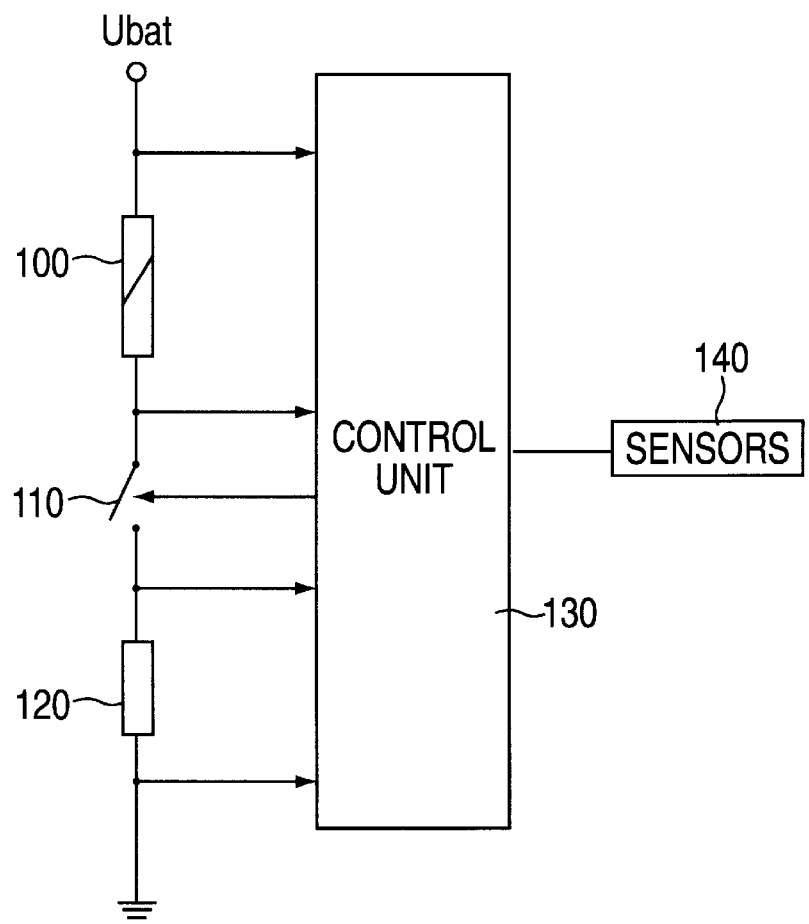
FIG. 1 shows a schematic arrangement for driving a solenoid valve according to the present invention.

FIG. 1 shows exemplary elements of the apparatus according to the present invention. A load 100 has its first terminal connected to supply voltage Ubat, and its second terminal in contact with a switching device 110. Switching device 110 connects the second terminal of the load to ground via resistive means (current-measuring device) 120. Load 100, switching device 110 and current-measuring device 120 are connected in series. The components can also be connected in a different order. Load 100 is preferably a coil of a solenoid valve. Switching device 110 is preferably a transistor, particularly a field-effect transistor.

Moreover, a control unit 130 is provided that has different signals fed to it from sensors 140. Moreover, the potentials at the inputs of load 100 and current-measuring device 120 are fed to control unit 130. Control unit 130 applies drive signals to switching device 110.

Based on the signals measured by the sensors 140, e.g., sensors to measure the rotational speeds of individual wheels, control unit 130 computes drive signals to be applied to switching device 110. Here, the voltage Ubat on load 100 and/or a current I that flows through load 100 is measured and evaluated. Current I is determined based on the voltage drop across resistive means 120.

Figure 2:
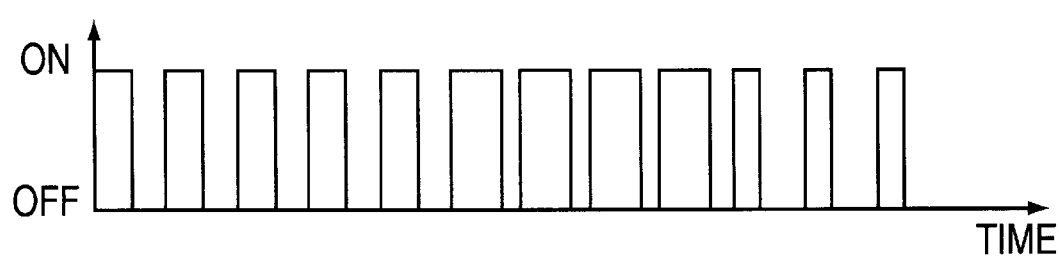
FIG. 2 shows drive signals plotted over time.

FIG. 2 shows a graphical plot of a drive signal applied to switching device 110 over time. According to the present invention, clocked driving is used. This means that the signal changes at a specifiable fixed frequency from its low level to its high level, which results in switching device 110 being closed and enabling the flow of current. After a specifiable time, the signal goes back from its high level to its low level, which opens in switching device 110. The closing operation of the switching device 110 (i.e., switching on) preferably takes place at such a frequency that the valves used can no longer follow this frequency. The valves thus react to an average drive signal. For example, values between 1 and 2 kilohertz are chosen for the frequency. The ratio of the duration for which the signal assumes a high level and the duration for which the signal assumes a low level is known as a duty factor, TV. Based on duty factor TV and the supply voltage Ubat, the voltage Ueff is obtained. To compensate for the influence of supply voltage Ubat on voltage Ueff, at least supply voltage Ubat is considered when stipulating the duty factor.

Figure 3:
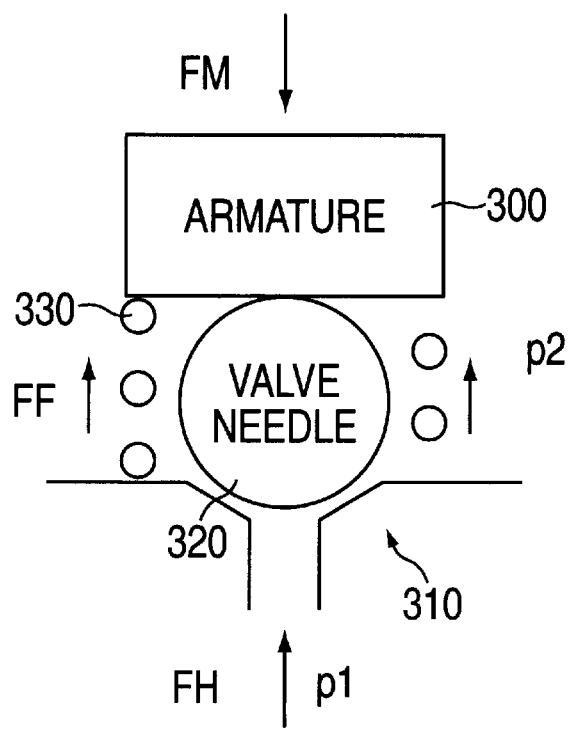
FIG. 3 shows an exemplary structure of the solenoid valve according to the present invention.

FIG. 3 shows a block diagram of the force relationships in the solenoid valve. An armature, upon which a magnetic force FM acts, is depicted as 300. A valve seat is designated as 310. A needle valve is designated as 320. A spring 330 applies a spring force FF to the armature. A hydraulic force FH acts upon needle valve 320, in parallel to spring force FF. The hydraulic force is based on the pressure difference between pressure P2 and pressure P1. In FIG. 3, pressure P1 acts upon the needle valve from below and pressure P2 from above. Magnetic force FM acts opposite to spring force FF and opposite to and hydraulic force FH.

If switching device 110 is in its open position, no current flows and the magnetic force FM assumes a value of zero. In this case, the solenoid valve is in its open position, i.e., needle valve 320 is raised from valve seat 310 and the hydraulic fluid flows through the gap between valve seat 310 and solenoid needle valve 320.

If a sufficient voltage is applied to the coil, then magnetic force FM becomes greater than the sum of spring force FM and hydraulic force FM. This causes spring 330 to be compressed, and needle valve 320 strikes valve seat 310 and the connection breaks.

If the driving of the solenoid valve is abruptly canceled, the magnetic force FM disappears abruptly, and the needle valve suddenly lifts up. This results in the hydraulic fluid being able to flow through the gap between valve seat 310 and solenoid needle valve 320. This abrupt removal of load from the solenoid valve is associated with disruptive noise generation.

To prevent this undesired effect, the following can be implemented according to the present invention: Using pulse-width modulation of the drive signal, i.e., through variation of duty factor TV, effective valve voltage Ueff is reduced in a ramp-shaped manner to zero. Thus, magnetic force FM is also reduced in a ramp-shaped manner. As a result, the pressure against which the valve can remain in its closed position, drops slowly. This means the valve begins to open.

Figure 4:
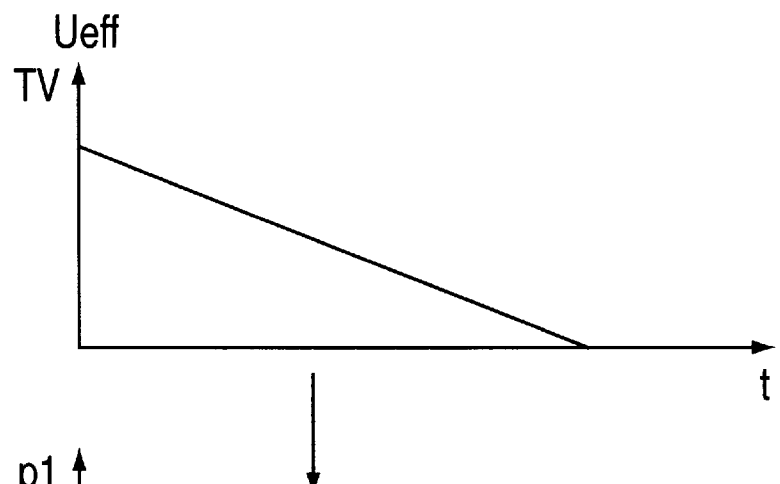
FIG. 4 shows a duty factor and pressure plotted over time.
Figure 4:
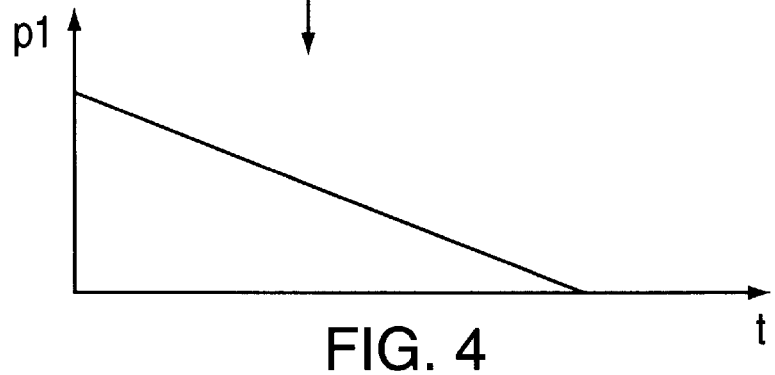

When the forces are in equilibrium, opening hydraulic force FH, spring force FF and closing magnetic force FM are in equilibrium. The speed of the pressure reduction and associated noise creation is thus adjustable. FIG. 4 shows effective voltage Ueff (or duty factor TV) and pressure P1 over time t1.

To open the solenoid valve, duty factor TV is reduced from a starting value necessary to hold the solenoid valve in its closed state in a ramp-shaped manner over time t down to zero. This results in effective voltage Ueff present at the solenoid valve likewise decreasing over time in a ramp-shaped manner. The equivalent applies to pressure P1 at which the solenoid valve still remains in its closed position. If this pressure reaches the pressure value prevailing in the hydraulic system, then the needle valve slowly lifts up and slowly enables the flow of hydraulic fluid. Through further reduction of duty factor TV, needle valve 320 lifts up further and increases the effective opening cross-section.

According to the present invention, effective voltage Ueff is varied over time such that valve armature 300, and consequently needle valve 320, slowly set into motion. For this purpose, duty factor TV is preferably varied in a ramp-shaped manner, i.e., duty factor TV drops from its starting value linearly over time to zero. Instead of duty factor TV, other quantities that have an effect on the voltage Ueff can also be reduced in a ramp-shaped manner over time. Due to the slow movement, abrupt release of the hydraulic fluid does not occur and, thus, no noise emission or only very little noise emission results. With this type of driving, the valve acts as a control valve.

Figure 5A:
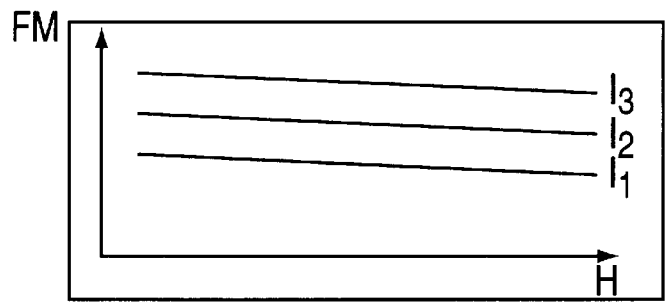
FIG. 5a shows a graphical plot of a magnetic force plotted for various currents over lift values (or time).
Figure 5B:
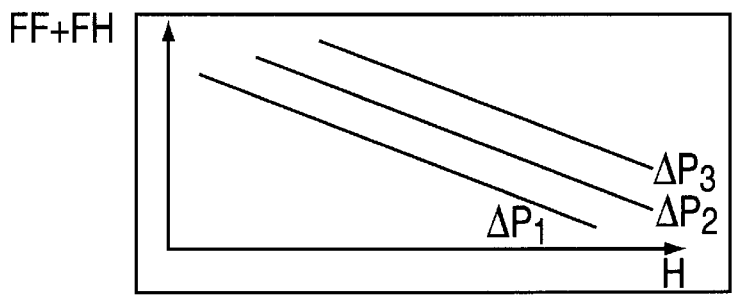
FIG. 5b shows a graphical plot of a sum of a spring force and a hydraulic force over the lift values (or time).
Figure 5C:
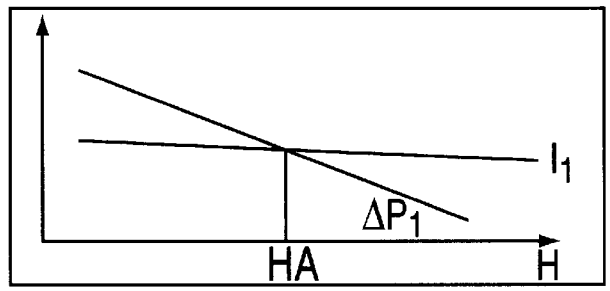
FIG. 5c shows a graphic plot of other pressures over the lift values (or time).

FIGS. 5a–5c show different forces plotted over lift H of magnetic needle valve 320. Lift H indicates the path over which magnetic needle 320 moves.

FIG. 5a shows a magnetic force FM plotted for different currents I1, I2 and I3 over lift H. Magnetic force FM is nearly linear and constant over lift H. It decreases only a little towards larger lifts. Magnetic force FM increases with increasing current.

In FIG. 5b, the sum of spring force FF and hydraulic force FH is plotted over lift H. Pressure difference ΔP between pressure P1 and pressure P2 is used as the parameter. The sum of forces FF+FH is nearly linear in the observed region. The force decreases linearly for increasing lift H. For increasing pressure difference ΔP, i.e., pressure P1 is greater than pressure P2, the sum of the two forces increases.

In FIG. 5c, the curve of magnetic force FM for a fixed current value and the sum of the two forces FF and FH for a fixed pressure difference is plotted over lift H. The two straight lines intersect at a point at lift value HA, which defines a working lift HA. At this lift value HA, pressure difference ΔP and current I1, the forces are in equilibrium.

Duty factor TV is selected in accordance with the present invention as a function of the pressure at which the solenoid valve is supposed to open, i.e., the needle valve lifts up. At a known pressure difference ΔP between the two pressure values P1 and P2, effective voltage Ueff and, thus, current value I can be chosen so that the needle valve lifts up. The current value is set using the duty factor. When driven with a certain duty factor, the valve opens at a certain pressure.

The valve is operated according to the present invention as a relief valve. For this purpose, duty factor TV is selected as a function of pressure PS at which the valve should open. This duty factor TV is applied to the coil. If the pressure is less than pressure value PS, then the sum of forces FF and FH is less than magnetic force FM and the valve is closed. If the pressure becomes greater than value PS, then the sum of forces FF and FH becomes greater than magnetic force FM and the valve opens. When driven this way, the valve acts as a relief valve.

Based on the clocked driving, a valve can be operatedas a control valve or as a relief valve by varying the driving action. This can yield considerable cost savings if, for example, control valves and relief valves are needed in an ABS system, ASR system or an FDR system. One can economize on one of the valves when suitable driving action.

Figure 6:
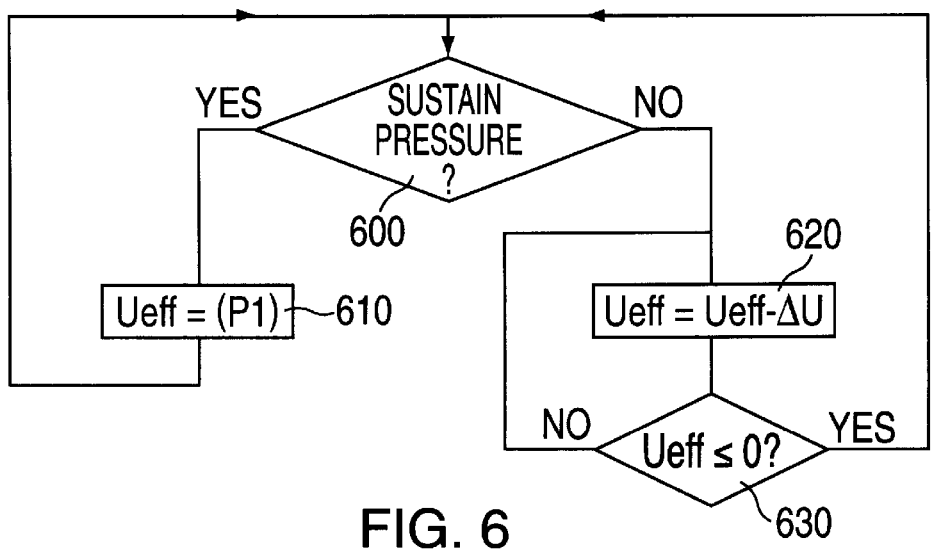
FIG. 6 shows a flowchart of an operation of the method and apparatus according to the present invention.

FIG. 6 shows a flowchart of an operation of the method and apparatus according to the present invention. An initial query 600 checks whether pressure P1 is to be sustained or reduced. If query 600 determines that the pressure should not be reduced, then the valve is driven as a relief valve. This means in step 610, duty factor TV and thus effective voltage Ueff are specified such that the valve opens at a certain value PS for the pressure P1. Step 600 follows subsequently.

If query 600 determines that the pressure should be reduced, then the valve is driven as a control valve. To bring the valve into its open state, in step 620, duty factor TV and thus voltage Ueff on the valve is reduced by a certain value ΔU. Query 630 subsequently checks whether the value of voltage Ueff is less than a specifiable value at which the valve has reliably opened. It is preferably checked whether the duty factor and thus voltage Ueff is less than or equal to zero. If this is not the case, step 620 follows anew. If Ueff is less than the specified value, then step 600 follows.

What is claimed is:

1. A method for driving a solenoid valve including a coil and a movable armature, comprising the steps of:

providing, in a clocked manner, at least one of a current and a voltage to the coil for moving the movable armature as a function of a predetermined duty factor; and varying a driving action of the movable armature to selectively operate the solenoid valve as one of a control valve and a relief valve.

2. The method according to claim 1, further comprising the step of:

varying the predetermined duty factor over time to slowly move the movable armature when the solenoid valve operates as the control valve.

3. The method according to claim 1, further comprising the step of:

varying the predetermined duty factor over time in a ramp-shaped manner.

4. The method according to claim 1, further comprising the step of:

varying the predetermined duty factor to vary at least one of the current and the voltage provided to the solenoid valve over time in a ramp-shaped manner.

5. The method according to claim 1, wherein the predetermined duty factor is specified to provide an equilibrium of forces between a pressure force, a resetting force and an adjustable magnetic force present in the solenoid valve.

6. The method according to claim 1, wherein the predetermined duty factor is determined as a function of a predetermined pressure for opening the solenoid valve when the solenoid valve operates as the relief valve.

7. The method according to claim 1, wherein the varying step comprises the further steps of:

determining whether a pressure should be reduced; and operating the solenoid valve as the one of a control valve and a relief valve depending on whether it is determined that the pressure should be reduced.

8. The method according to claim 7, wherein the solenoid valve is operated as the relief valve if the pressure should not be reduced.

9. The method according to claim 7, wherein the solenoid valve is operated as the control valve if the pressure should be reduced.

10. An apparatus for driving a solenoid valve including a coil and a movable armature, comprising:

means for providing, in a clocked manner, at least one of a current and a voltage to the coil for moving the movable armature as a function of a predetermined duty factor; and means for varying a driving action of the movable armature to selectively operate the solenoid valve as one of a control valve and a relief valve.

11. The apparatus according to claim 10, wherein the means for varying further comprises:

means for determining whether a pressure should be reduced; and means for operating the solenoid valve as the one of a control valve and a relief valve depending on whether the means for determining determines that the pressure should be reduced.

12. The apparatus according to claim 11, wherein the solenoid valve is operated as the relief valve if the pressure should not be reduced.

13. The apparatus according to claim 11, wherein the solenoid valve is operated as the control valve if the pressure should be reduced.

* * * * *